US009132970B2

(12) United States Patent
Duchemin et al.

(10) Patent No.: US 9,132,970 B2
(45) Date of Patent: Sep. 15, 2015

(54) METHOD FOR GROUPING PRODUCTS TOGETHER WITH A VIEW TO CASE PACKING SAME

(75) Inventors: Guillaume Duchemin, Octeville-sur-Mer (FR); Didier Mougin, Octeville-sur-Mer (FR); David Gatos, Octeville-sur-Mer (FR); Thierry Garnier, Octeville-sur-Mer (FR)

(73) Assignee: C.E.R.M.E.X. CONSTRUCTIONS ETUDES ET RECHERCHES DE MATERIELS POUR L'EMBALLAGE D'EXPEDITION, Corcelles-les-Citeaux (FR)

( * ) Notice: Subject to any disclaimer, the term of this patent is extended or adjusted under 35 U.S.C. 154(b) by 892 days.

(21) Appl. No.: 13/387,272

(22) PCT Filed: Dec. 30, 2009

(86) PCT No.: PCT/FR2009/052721
§ 371 (c)(1),
(2), (4) Date: Jan. 26, 2012

(87) PCT Pub. No.: WO2011/012775
PCT Pub. Date: Feb. 3, 2011

(65) Prior Publication Data
US 2012/0118701 A1 May 17, 2012

(30) Foreign Application Priority Data

Jul. 30, 2009 (FR) ...................................... 09 55340

(51) Int. Cl.
*B65G 47/08* (2006.01)
*B65G 47/82* (2006.01)
(52) U.S. Cl.
CPC .............. *B65G 47/088* (2013.01); *B65G 47/82* (2013.01)

(58) Field of Classification Search
USPC ......... 198/419.3, 426, 431, 456, 459.1, 459.6
See application file for complete search history.

(56) References Cited

U.S. PATENT DOCUMENTS 3,244,266 A * 4/1966 Zappia et al. ................. 198/430
3,481,107 A 12/1969 Andblad et al.
(Continued)

FOREIGN PATENT DOCUMENTS

DE      250 023 A3   9/1987
EP    0 265 559 A1   5/1988
(Continued)

OTHER PUBLICATIONS

French Search Report for FA 724906, dated Apr. 8, 2010.
(Continued)

*Primary Examiner* — Douglas Hess
(74) *Attorney, Agent, or Firm* — Sughrue Mion, PLLC (57) ABSTRACT

The invention relates to a method for grouping together products that arrive in line and are spaced apart from each other on an infeed conveyor (2), consisting of: collecting the products on the fly by means of a pair of collectors (4) that move transversely relative to the products on said conveyor (2); moving the products collected by collector (4A) to a removal station (11) and, at the same time, replacing said collector (4A) with the second collector (4B) that, in turn, collects the products; and dropping off the products from collector (4A) to the removal station (11) and bringing said collector (4A) back to a collecting position while intersecting collector (4B). The equipment includes a pair of carriages (7), each of which has a collector (4), said carriages being moved transversely and said collectors (4) being mounted on actuators (12) that move the collectors so as to transfer the latter from the removal position to a retracted position that makes it possible for said collectors (4) to intersect one other.

13 Claims, 7 Drawing Sheets

(56) References Cited

U.S. PATENT DOCUMENTS

| | | | |
|---|---|---|---|
| 3,724,639 A * | 4/1973 | Hara | 198/430 |
| 5,161,664 A * | 11/1992 | LeBras | 198/419.3 |
| 5,203,444 A * | 4/1993 | Munch | 198/418.7 |
| 5,429,651 A * | 7/1995 | Bolin | 65/241 |
| 6,019,213 A * | 2/2000 | Schubert | 198/419.3 |
| 6,164,045 A * | 12/2000 | Focke et al. | 53/543 |
| 6,179,115 B1 * | 1/2001 | de Guglielmo et al. | 198/626.1 |
| 6,223,884 B1 * | 5/2001 | Ronchi | 198/457.01 |
| 6,889,485 B2 * | 5/2005 | Davaillon | 53/443 |
| 7,347,312 B2 * | 3/2008 | Han et al. | 198/346.2 |
| 7,416,072 B2 * | 8/2008 | Gosset | 198/429 |
| 7,665,598 B2 * | 2/2010 | Begin et al. | 198/419.3 |
| 8,167,113 B2 * | 5/2012 | Mougin et al. | 198/418.5 |
| 8,668,072 B2 * | 3/2014 | Gatos | 198/431 |
| 8,695,781 B2 * | 4/2014 | Mougin et al. | 198/431 |
| 2004/0112714 A1 | 6/2004 | Davaillon | |
| 2010/0193326 A1 | 8/2010 | Mougin et al. | |

FOREIGN PATENT DOCUMENTS

| | | |
|---|---|---|
| EP | 1 052 200 A1 | 11/2000 |
| FR | 2 918 359 A1 | 1/2009 |
| GB | 1183475 A | 3/1970 |
| NL | 6 700 965 A | 7/1967 |
| WO | 2008/022296 A2 | 2/2008 |

OTHER PUBLICATIONS

International Search Report for PCT/FR2009/052721, dated Apr. 19, 2010.

* cited by examiner

METHOD FOR GROUPING PRODUCTS TOGETHER WITH A VIEW TO CASE PACKING SAME

CROSS REFERENCE TO RELATED APPLICATIONS

This application is a National Stage of International Application No. PCT/JP2009/052721 filed Dec. 30, 2009, claiming priority based on French Patent Application No. 09 55340 filed Jul. 30, 2009 the contents of all of which are incorporated herein by reference in their entirety.

The present invention relates to a method for grouping products together with a view to case packing same, for example; it also relates to the equipment that allows the implementation of this method, i.e. a machine that groups together products such as vials, bottles or the like, with a view to case packing same.

The grouping together of products can be carried out in different ways depending on the type and nature of the products and also depending on the desired speeds.

A form of grouping together is in particular described in document FR 2 918 359: the products arrive in line on an infeed conveyor and they are picked up, on the fly, by a collecting device, called a collector, in the form of a comb, which is arranged transversely relative to the longitudinal direction of arrival of said products.

This collector is moved in a loop that comprises a first part for collecting the products then transferring them to a removal station and a second part for bringing said collector back to the start.

In the first part of the loop, the collector moves, on the one hand, in order to collect the products, by combining two step-by-step movements: a longitudinal movement to travel up the queue of products, and a transverse movement to fill said collector and, on the other hand, a simple transverse movement to transfer the batch to the removal station where it is picked up by other means.

The second part of the loop comprises movements, combined or not, in the longitudinal and transverse direction, to bring the collector back to the infeed conveyor, in front of the first product to be collected.

For certain applications, such a device also makes it possible to deposit the products on either side of the infeed conveyor for optimum management of case-packing speeds.

However, the movements of the infeed conveyor and the movements of the collector are very different: the infeed conveyor has a continuous movement whereas the collector has a sequential movement with relatively complex movements that generate accelerations and high speeds, which can have a tendency to cause incidents.

The movement for bringing the collector back in front of the first product to be collected takes place while it is empty; it constitutes dead time which, as a result, limits the speed of the product collecting device.

The present invention proposes a method and a machine for grouping together products that make it possible to establish continuity of the operation of collecting the products on the infeed conveyor, in order to bring the collector, in a certain manner, in phase with said infeed conveyor.

This continuity of the operation of collecting the products also makes it possible, in a unique manner, to simplify the movements that are implemented in the collection cycle and to reduce the stress on the equipment by reducing in particular the speeds and accelerations to which it is subjected.

The grouping method according to the invention consists of:
collecting on the fly the arriving products, carried by an infeed conveyor, by means of a pair of collectors in the form of rectilinear combs provided with recesses, which collectors move transversely relative to the longitudinal direction of arrival of said products,
collecting the products by means of a first collector, then, when said first collector is filled up, collecting said products in the same way by means of a second collector that immediately takes over from said first collector,
moving said first filled collector transversely relative to said longitudinal direction of arrival and at a speed that is greater than the collection speed, in order to drop off the batch of products at a removal station situated on the side of said infeed conveyor,
then moving said first collector in a loop that is divided into a backward movement for dropping off the products at said removal station, along a line that is parallel to the orientation of the recesses of said collector, then a return movement during which it intersects said second collector, which is being loaded, before being positioned behind said second collector and taking over the collection operation when this second collector is in turn filled up,
moving, with appropriate means, the batch of products that have been dropped off by said first collector at the removal station,
depositing the batch of products collected by said second collector at said removal station,
moving said second collector in the same loop as said first collector and continuing the cycle of collecting, grouping together and dropping off the products at said removal station,
carrying out the collection of the products on the infeed conveyor under the control of a sensor that detects the arrival of the products to be collected on said infeed conveyor, which sensor triggers, via an automatic controller, for example, the stopping of the collector at the collection station.

According to a first embodiment, the backward and retraction movement of the collector, from the removal station, to drop off the batch of products, consists of a longitudinal movement parallel to the axis of the movement of the infeed conveyor of said products.

According to a variant embodiment, for products the cross-section of which is not circular, such as oval vials, for example, and which are collected in a so-called "herringbone" configuration in recesses arranged obliquely, the backward and retraction movement of the collector, from the removal station, is an oblique movement, parallel to the orientation of the recesses of said collector so as to drop off the batch of products without upsetting them, before carrying out a complete return to the start, to the product collection station.

Still according to the invention, the method consists of removing the products grouped together in batches at the removal station by appropriate means such as a robot or other means; the batch formed can then be placed inside a container, a case, for example.

The invention also relates to the equipment that allows the implementation of the method previously described in detail, i.e. a machine that comprises:
an infeed conveyor of the products to be grouped together,
a receiving table comprising a removal station for receiving the batch of grouped-together products, which table is arranged at the same level as and on one side of said infeed conveyor, in its downstream part, collectors in the form of combs provided with recesses, which collectors are mobile above the level of said receiving table and said infeed conveyor, appropriate means for moving each collector relative to said infeed conveyor and relative to the receiving table, so as to carry out continuous collection of the products, means for controlling the position of the products on the infeed conveyor, for triggering, by means of an automatic controller, for example, the movements of the collectors.

According to another arrangement of the invention, the collectors are arranged perpendicular to the longitudinal advancement direction of the products on said infeed conveyor and they move above said infeed conveyor, in the same plane which is parallel to that of said infeed conveyor and of the receiving table, so as to collect the products, on the one hand, at the same level on the height of the body of said products and, on the other hand, always at the same place on said infeed conveyor, at the collection station.

Still according to the invention, the collectors are each held by a carriage and by means of an actuator in the form of a cylinder that is integral with said carriage, which carriages are superimposed and guided transversely relative to the longitudinal axis, and said actuators move the collectors to transfer them from the transverse axis where they carry out the collection and the removal of the products to a retracted position that makes it possible for them to return to the start, by intersecting one another.

According to a first embodiment, the carriages and the actuators of the collectors are situated downstream of the infeed conveyor of the products, at the same level as said collectors.

According to a second embodiment, the carriages and the actuators of the collectors are situated under the downstream end of the infeed conveyor of the products and the collectors, which are situated above said downstream end, are held by a U-shaped structure connecting said collectors to the corresponding actuators.

Still according to the invention, the structures holding the collectors comprise horizontal arms, which arms are bayonet-shaped and are vertically offset relative to one another to allow the corresponding collectors to intersect one another.

According to a variant, the collectors are held by arms that are situated in the plane of said collectors, which arms, and collectors, are vertically mobile, by means of cylinders interposed between the actuator and the corresponding carriage, in order to be vertically offset allowing said collectors to intersect one another.

Still according to the invention, the collector can comprise recesses the longitudinal depth of which makes it possible to receive several products that lend themselves to being grouped together beforehand.

According to the invention, the collector comprises recesses that are arranged obliquely relative to the direction of arrival of the products, at a non-zero angle of the order of 10 to 45°, so as to form batches of products that are arranged in a so-called "herringbone" configuration for products the cross-section of which, where they are gripped, is not circular but oval, for example, as is the case with vials in particular. In this case, the collectors are each held by an actuator that is also arranged obliquely, at the same angle as the recesses, and the lateral ends of said collectors are arranged in order to allow two consecutive collectors to be placed end to end in order to produce a series of movements of collection of the products arriving continuously.

Still according to the invention, the collector can be constituted by several recessed plates that are superimposed and separated by means of spacers, so as to provide several support zones for the collected products in order to improve their stability during their collection and during their movement.

According to another arrangement of the invention, the equipment can comprise at least one robot for picking up the batches of products at the removal station, said robot being made with a head capable of picking up at least one line of products, vials or the like, with a view to case packing same, for example.

According to another arrangement of the invention, the removal station for the products, vials or the like, is constituted by a stationary plane on which the collected products take their place as they are moved laterally, carried along by the collector, which stationary plane can comprise an arrangement of the boss or hump type, for example, to form an obstacle and retain the products at said removal station, when said collector moves backwards.

According to another arrangement of the invention, in the event that the batch of products is packed in a case of the "wrap-around" type, the equipment can comprise a pushing device that allows, for example, a simple lateral transfer of said batch of products towards a case-packing system arranged around the removal station on which a blank of the wrap-around type is travelling.

So that it can be executed, the invention is disclosed in a sufficiently clear and complete manner in the following description which, moreover, is accompanied by drawings in which.

Figure 1:
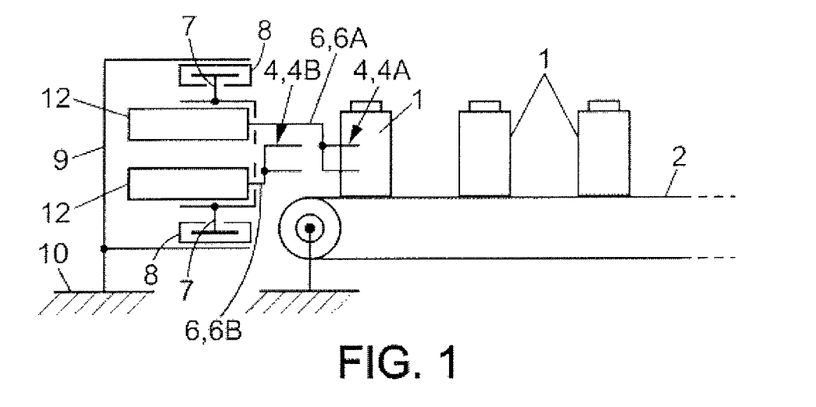
FIG. 1 is a diagrammatic elevation of the equipment according to the invention.

FIG. 1 shows products 1 arranged on the infeed conveyor 2. These products 1 arrive one behind the other, in single file, and they are, preferably, evenly spaced or grouped together in several units, by appropriate means, not shown.

The infeed conveyor 2 of the products is constituted by an endless belt and it comprises, laterally, at its downstream end, a table 3. This table 3, visible in FIG. 2 in particular, is intended to receive the products 1 that have been grouped together in the form of a batch; it is situated in the same horizontal plane as the upper part of the infeed conveyor 2 of said products.

Figure 2:
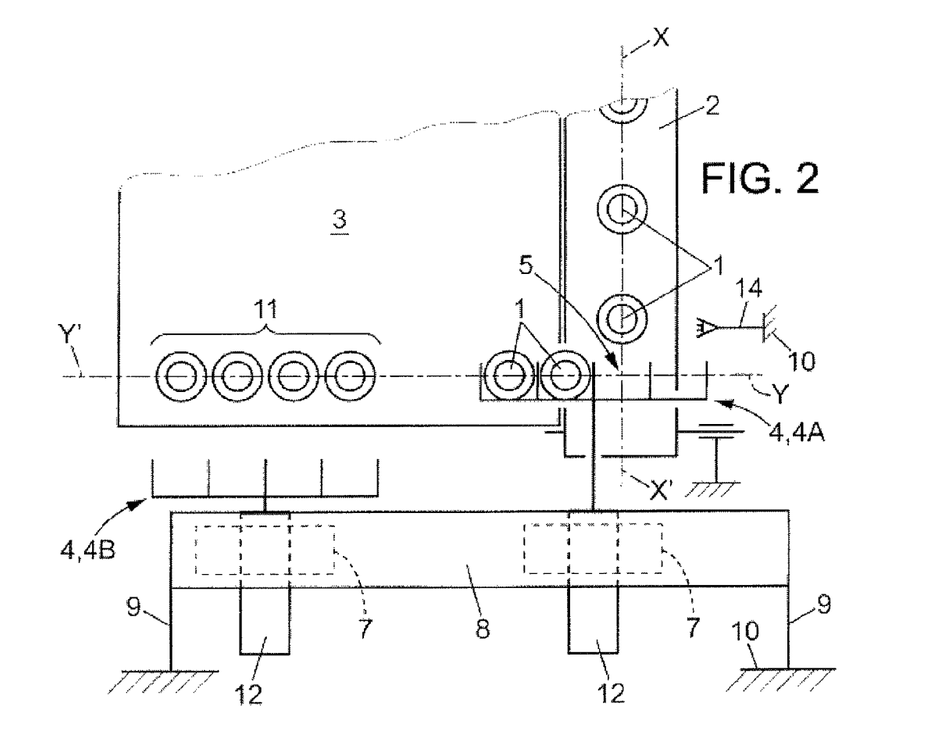
FIG. 2 is a diagrammatic top view of the equipment.

This table 3 is presented in the form of a simple stationary plane on which the products 1 can slide.

The products 1 are collected, at the downstream end of the conveyor 2, by a collecting device which comprises two collectors 4. These collectors 4, marked 4A and 4B, take it in turn to collect the products 1 which arrive continuously, one behind the other, brought by the conveyor 2, on a longitudinal axis xx'. The collection of the products 1 is preferably always carried out at the same point, at the downstream end of the infeed conveyor 2, at a collection station 5, FIG. 2. This collection is carried out step-by-step by the collectors 4A and 4B which move, during the operation, in particular, on a transverse axis yy', perpendicular to the axis xx', as shown in the embodiment in FIG. 2.

These collectors 4 are presented in the form of combs, or racks. Depending on the shape of the products 1 to be collected, each collector 4 can comprise several superimposed combs; the collectors 4 shown in the figures comprise two superimposed combs, slightly spaced apart, in order to firmly wedge the products 1 and guarantee good vertical stability during their transverse movement, in particular.

The collectors 4 are held by arms 6 that are arranged so as to allow said collectors to intersect one another. These arms 6A and 6B are bent, in the shape of a bayonet, in order to allow the collectors 4A and 4B to intersect one another, as described in detail below.

Each collector 4 is arranged on a carriage 7 that is moved transversely relative to the infeed conveyor 2, i.e. it moves parallel to the axis yy'. Each carriage 7 is guided by means of a slide system 8, for example, and these slides 8, corresponding to each carriage 7, are superimposed, held by a chassis 9 that is integral with the general frame 10 of the equipment.

The carriages 7 are themselves also superimposed and they are transversely mobile under the effect of appropriate actuators such as servomotors with reduction gears and timing belts, on the one hand in order to collect the products 1 on the infeed conveyor 2 and on the other hand in order to deposit all said products 1 on the side of the conveyor 2, i.e. on the table 3, at the removal station 11 where said products 1 form a batch awaiting removal by appropriate complementary means.

The table 3 can comprise, at the removal station 11, an arrangement in the form of a boss or hump, for example, for retaining the products when the collector carries out its backward movement in order to drop off the products at said station 11.

Each collector 4 is moved longitudinally, parallel to the axis xx', in order to pass from an inactive position, retracted relative to the line yy', to an active position for collection and transfer-removal, on this line yy', as described in detail below with reference to FIGS. 5 to 15.

Each collector 4 is held by a carriage 7, but by means of an actuator 12 in the form of a cylinder, which actuator 12 carries out the longitudinal movement of said collector 4 between the collection line and the line of return to the start. The rod of the cylinder that constitutes the actuator 12 acts as an arm 6 for holding the associated collector 4.

The stroke of these actuators 12 is relatively short; it is selected in order to release the products 1 at the removal station and avoid any interference between the two collectors 4 when they intersect one another during their movement in the cycle described in detail below.

The collectors 4 are situated, respectively, at the same level relative to each other and relative to the infeed conveyor 2. The collection of the products 1 is carried out at a constant level on the height of the body of said products 1, irrespective of the collector in action, which level can be adjusted depending on the type of product 1, via appropriate adjustment means that modify the position of said collectors relative to the level of said infeed conveyor 2.

Figure 3:
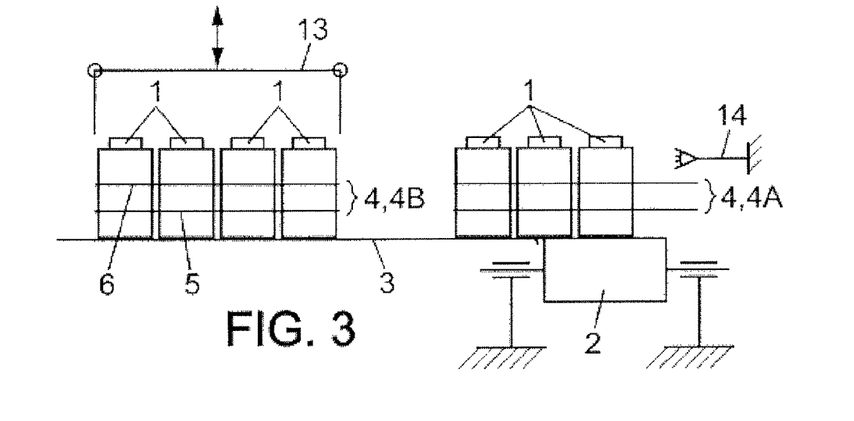
FIG. 3 is a diagrammatic end view of the equipment, with the two collectors in position, but without the detail of the means for manoeuvring said collectors.

When the products 1 are dropped off by either of the collectors 4, at the removal station 11, an appropriate gripping device comprising a gripping head 13, as shown in FIG. 3, removes the batch of products 1 placed on the table 3.

These means for removing the batch of products 1 are, for example, constituted by a handling robot, not shown, which is arranged near the table 3 in order to grasp said batch and place it in a case or the like, depending on its destination.

In order to load the batch of products 1 into a case of the "wrap-around" type, the equipment can also additionally comprise a pusher, not shown, which moves said batch on the table 3 in order to place it in said case which arrives, for example, on a conveyor adjacent to said table 3.

Figure 4:
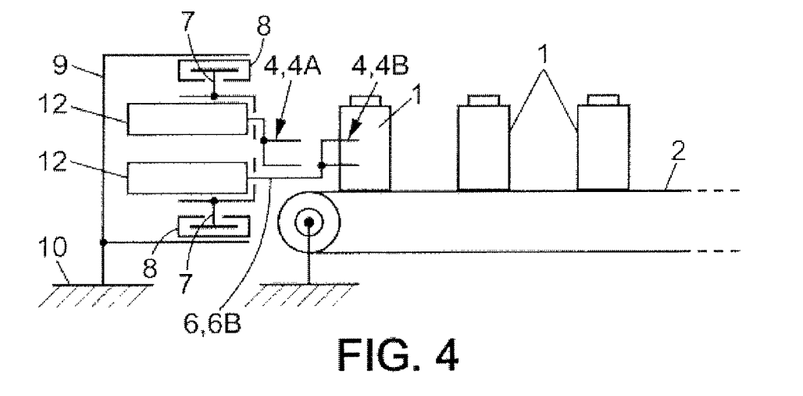
FIG. 4 is a diagrammatic elevation of the equipment according to the invention, like FIG. 1, with a reversal of the position of the two collectors.

FIG. 4 shows the collectors 4A and 4B in a position that is reversed relative to their position shown in FIG. 1. In this FIG. 4, the collector 4B collects the products 1 arranged on the infeed conveyor 2 and the collector 4A is retracted; this collector 4A is positioned in order to move transversely without interfering with said collector 4B and reposition itself so as to take over from said collector 4B and, in turn, to collect the products 1 arriving one behind the other on said conveyor 2.

FIGS. 5 to 14 illustrate a few stages of the method of collection of the products 1 arriving on the infeed conveyor 2, which stages are marked I to X in Roman numerals.

Figure 5:
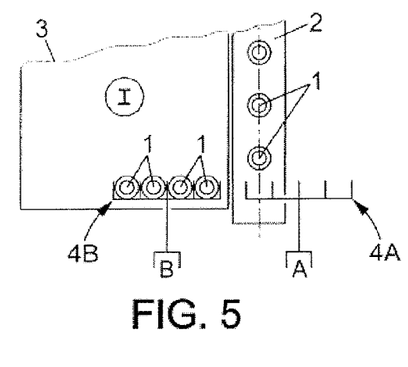
FIGS. 5 to 14 illustrate the movement of the collectors for carrying out the grouping together of the products on the pick-up station.

FIG. 5 corresponds to Stage I; it shows, diagrammatically, the infeed conveyor 2 of the products 1, and in this figure the collector 4A will be noted, held by its actuator marked A, which is in the active position of collecting the products and the collector 4B which is filled up with products, i.e. the different products 1 fill all the compartments of said collector 4B. The products 1 of the collector 4B are on the receiving table 3 and are moved sliding transversely as this collector 4B moves.

Figure 6:
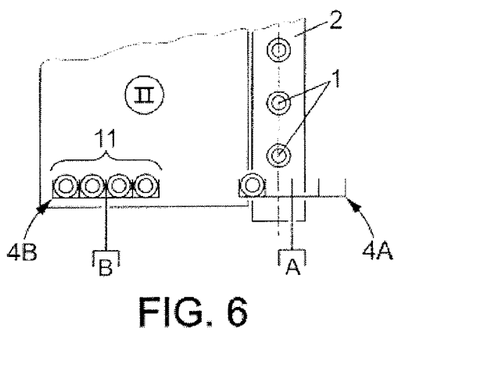

FIG. 6 corresponds to Stage II; it shows the collector 4A after the collection of a first product 1; this collector 4A is offset laterally towards the receiving table 3 immediately after collection of the first product 1 in order to be positioned awaiting the second product 1. During this time, the collector 4B has been placed, with its batch of products 1, at the removal station 11.

The speed of transfer of the collector with the batch of products 1 towards the removal station 11 is greater than its speed during the collection operation. The time taken for filling all the compartments, or recesses, of the collector corresponds to the time required for all of the rest of the loop, as described in detail below.

Figure 7:
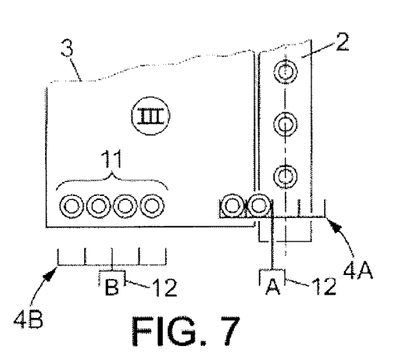
Figure 8:
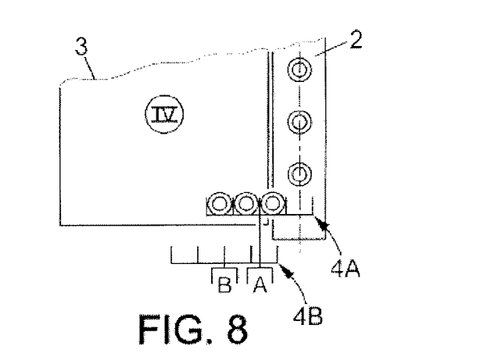

In FIG. 7, which corresponds to Stage III, the collector 4B has retracted while dropping off the different products at the removal station 11 and it has withdrawn longitudinally, along a line parallel to the orientation of its recesses, by a backward movement caused by the retraction of the actuator B before then moving transversely in order to intersect the collector 4A, as shown in FIG. 8, which corresponds to Stage IV.

Figure 9:
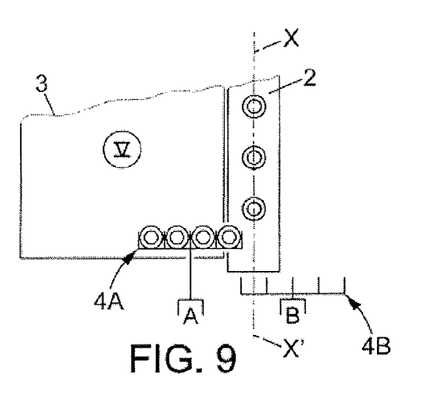

This collector 4A continues its operation of collecting the products 1 and, in FIG. 9, which corresponds to Stage V, it will be noted that this collector 4A is filled up with products 1 whereas the collector 4B has arrived opposite the collection station 5, with its first recess centred on the axis xx' of the infeed conveyor 2.

Figure 10:
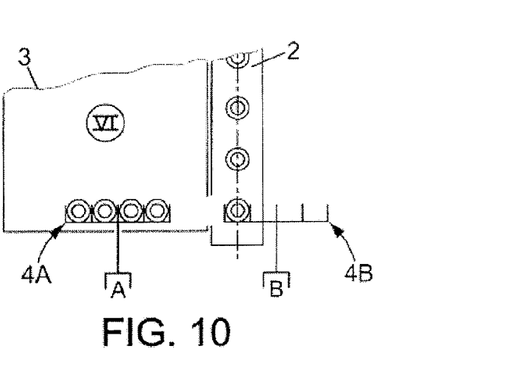

FIG. 10, which corresponds to Stage VI, is similar to FIG. 5 with a reversal of the collectors 4A and 4B. The collector 4A moves transversely above the receiving table 3, towards the removal and pick-up station 11 and the collector 4B commences the collection of the products 1.

Figure 11:
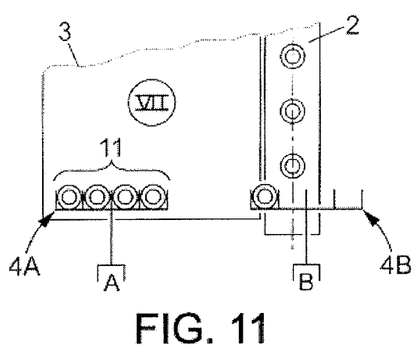
Figure 12:
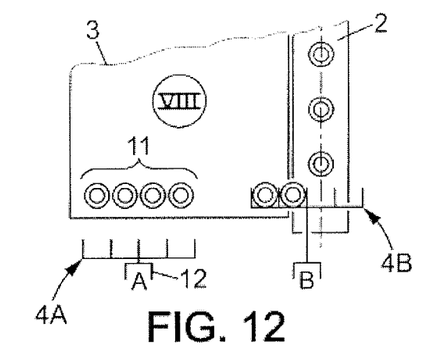

In FIG. 11, which corresponds to Stage VII, the collector 4A positions its batch of products 1 at the removal station 11 and, in FIG. 12, which corresponds to Stage VIII, it drops off the batch of products before moving, in turn, longitudinally, due to the retraction of its actuator A. During this time, the collector 4B collects the different products 1 that are presented on the infeed conveyor 2.

Figure 13:
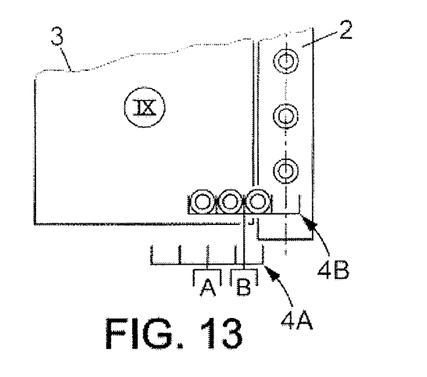
Figure 14:
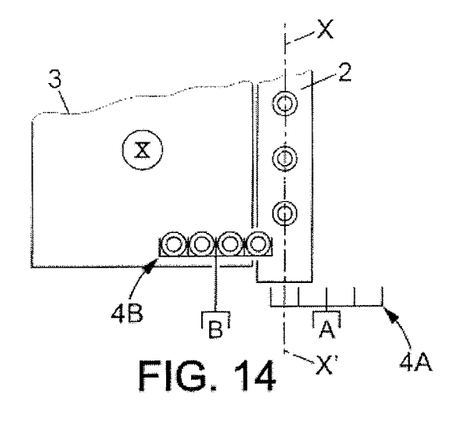

In FIG. 13, which corresponds to Stage IX, the collector 4A moves transversely and intersects the collector 4B before positioning, as shown in FIG. 14 which corresponds to the last Stage X, its first recess along the axis xx' of the infeed conveyor 2 of the products 1 while the collector 4B is filled up and recommences its movement, as shown in FIG. 5, Stage I, on the receiving table 3 in order to place its batch of products 1 at the removal station 11, and the cycle continues.

Figure 15:
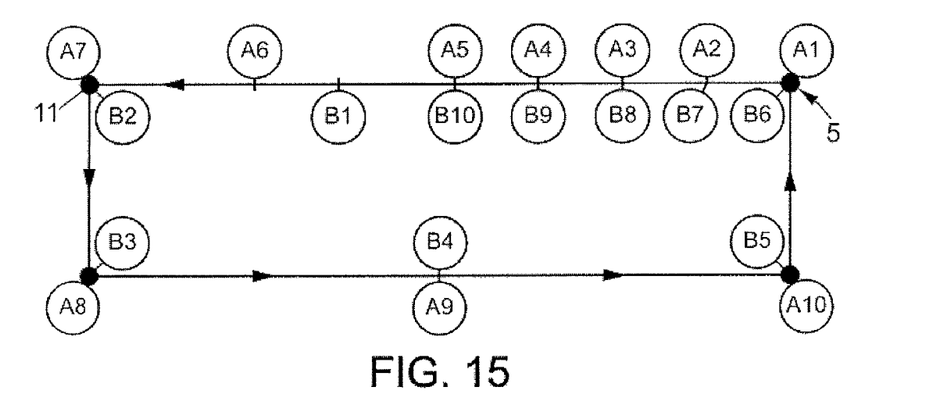
FIG. 15 shows the path followed by each of the collectors, with the positions that they progressively take up in order to carry out a complete cycle of collection and removal of the products.

This cycle of the two collectors 4A and 4B is shown diagrammatically in FIG. 15. This closed cycle is of the polygonal type, square, for example, or rather rectangular, with the point that corresponds to the position of the collector 4A in FIG. 5 and is marked A1 in FIG. 15 as its starting point. The position A1 on the cycle in FIG. 15 corresponds to Stage I marked in Roman numerals, FIG. 5, on the receiving table 3.

This point A1 is the equivalent of Stage VI for the collector 4B. It will be noted, on this cycle, that the speeds of the collectors change depending on the operation in progress.

During the phase of collection of the products 1, the transverse movements of the collectors 4 are small; they are equal to the pitch between two adjacent recesses. The laws of movement of the collectors: the collector 4A from A1 to A4 and the collector 4B from B6 to B9 are, preferably, of the bell or triangle type, i.e. an acceleration immediately followed by a deceleration without maintaining a plateau at a constant speed.

At the moment when the products 1 start entering the recesses of a collector 4, this collector can be at a standstill. However, depending on the nature and the speed of arrival of the products, for products which, for example, have a short length, on the axis xx', the collector can advance with a movement the speed of which is constant and continuous and, in this case, the products enter the recesses and are loaded on the fly.

The cycle is divided into two periods of the same duration: a period from A1 to A4 and from B6 to B9 for the collection of the products 1 and a period from A5 to A10 and from B7 to B5 that includes the time for the removal of the products, from A7 and B2, and the return to the start in order to take over collection by passing through A8 as far as A10 and B3 as far as B5.

The time taken by the collectors to carry out the part of the cycle that corresponds to the collection of the products is related to the rate of the infeed conveyor 2.

The time that each collector 4 has, when it is filled up with products 1, to carry out the other part of the cycle, corresponds to this time for collecting the products 1 until the other collector 4 is filled up.

This cycle, of the square, or rather rectangular, type has the advantage of utilizing relatively simple means constituted, on the one hand, by carriages 7 mounted on slides 8 for the transverse movement and, on the other hand, by actuators 12, of the cylinder type, for the longitudinal movement of said carriages 7.

Preferably, the collection of the products 1 is carried out under the control of a sensor 14 that detects the transfer of a product and makes it possible, by means of an automatic controller, to know its distance relative to the collector 4 assigned to the collection of the product 1 arriving on the infeed conveyor 2, and also depending on the speed of said conveyor 2. This sensor 14, visible in FIGS. 2 and 3, is positioned laterally, on the side of the conveyor 2 that is opposite the receiving table 3, and upstream of the position of the collectors 4 when they are in the collection position.

The collectors 4 (4A, 4B) preferably comprise combs installed in a detachable manner relative to the actuators so that the shape of the recesses of these combs can be more easily matched to the cross-section of the products 1 to be grouped together.

Each collector 4 can be presented, for example, in the form of a plate made of thermoplastic material with recesses that have a shape that corresponds as faithfully as possible to that of the products to be collected. These recesses are centred on an axis that is parallel to the axis xx' of the infeed conveyor 2 of the products and their dimension can also vary depending on whether the user wishes to collect one or two products or more, in the longitudinal direction in particular.

Figure 16:
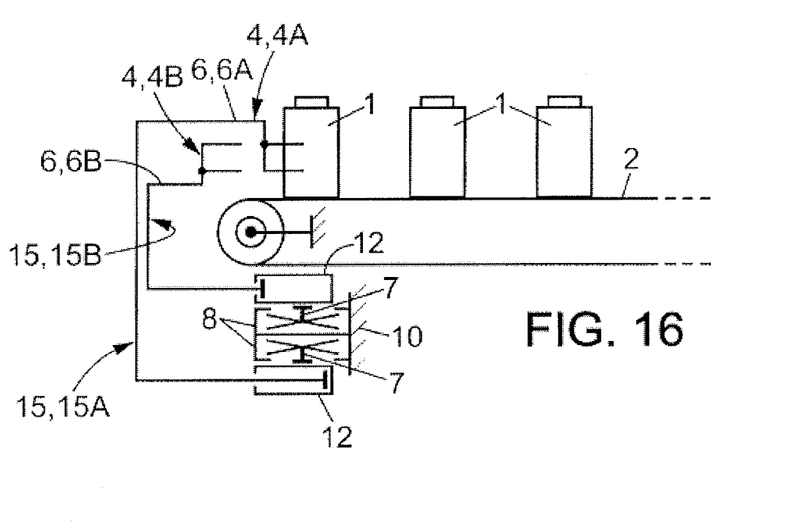
FIG. 16 is a diagrammatic elevation of a variant embodiment of the invention showing the means for manoeuvring the collectors, which manoeuvring means are arranged under the downstream end of the infeed conveyor of the products.

FIG. 16 shows a variant embodiment of the equipment according to the invention. The collectors 4 remain situated at the same level in order to always collect the products 1 in the same position and the means for moving the collectors are arranged under the downstream end of the infeed conveyor 2.

This arrangement in particular makes it possible to envisage freeing the passage at the end of the infeed conveyor 2 of the products. In fact, it makes it possible to retain the option, with an appropriate arrangement of the arms holding the collectors and/or of the conveyor system, as for the machine described in the abovementioned patent FR 2 918 359, of shunting the machine for grouping together products and transferring the products that are carried by the infeed conveyor 2, to another destination, downstream of the machine.

A U-shaped structure 15 extends between each collector 4 and its actuator 12.

As shown in FIG. 16, the structure 15A, which holds the collector 4A, extends around the structure 15B that holds the collector 4B in order to allow the intersection of said collectors 4 and the structures 15.

Figure 17:
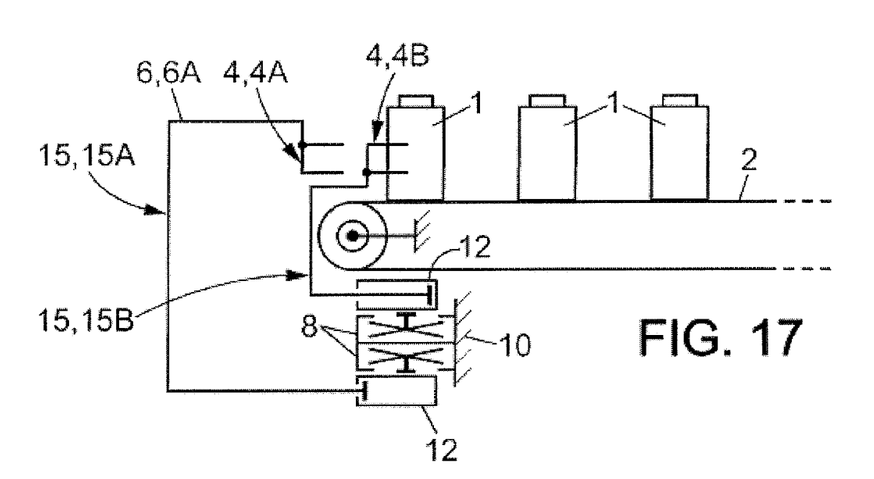
FIG. 17 corresponds to FIG. 16 with a reversal of the role of the two collectors.

FIG. 17 shows a reversal of the collectors 4A and 4B. The collector 4B is in the active position for collection of the products 1 whereas the collector 4A is retracted in order to intersect the collector 4B in its return movement to the initial collection position, behind the collector 4B.

The movement of the collectors 4A and 4B is identical to the movement of the collectors shown in FIG. 1 in particular.

This arrangement of the carriages 7 that hold the actuators 12 and the corresponding collectors makes it possible to move the slides 8 under the level of the infeed conveyor 2 and to reduce the general footprint of the machine.

It will be noted, in these FIGS. 16 and 17, that the arms 6A and 6B of the structures 14A and 14B are, as previously, bayonet-shaped, in order to offset the corresponding collectors 4A and 4B, so as to allow said corresponding collectors 4 to intersect one another.

Figure 18:
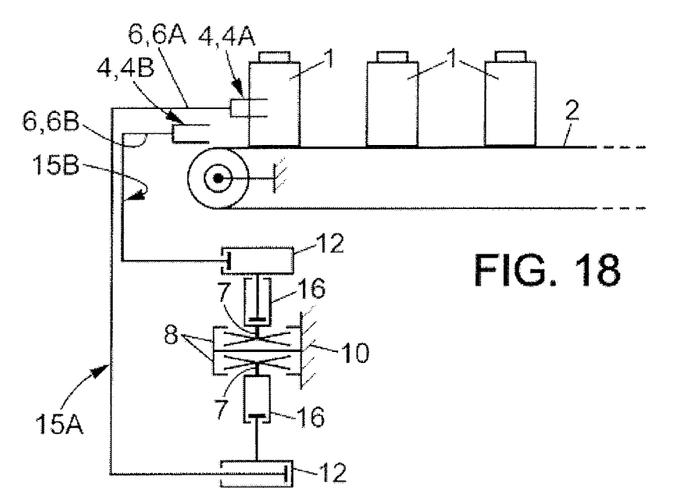
FIG. 18 also shows a diagrammatic elevation of the equipment according to another embodiment in which the collectors change level in order to intersect one another.
Figure 19:
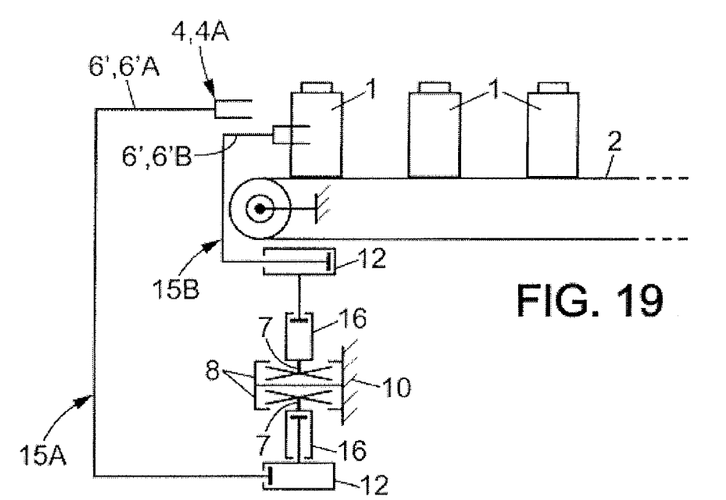
FIG. 19 corresponds to FIG. 18 with a reversal of the role of the collectors.

FIGS. 18 and 19 show a variant embodiment of the equipment illustrated in FIGS. 16 and 17. In this embodiment, the arms 6'A and 6'B of each structure 15A and 15B, respectively, are positioned on the median axis of the corresponding collector 4, i.e. these arms 6' are rectilinear and not bayonet-shaped as was the case previously in FIGS. 16 and 17.

In order to allow the collectors to intersect one another, each structure 15A and 15B is vertically mobile by means of a cylinder 16 which, as shown in FIGS. 18 and 19, is interposed between the carriage 7 and the corresponding actuator 12.

Here too, the positioning of the means for manoeuvring the collectors 4, under the downstream end of the infeed conveyor 2, makes it possible to free the downstream end of said conveyor 2, at the collectors 4, so as to give the machine a more compact form.

Figure 20:
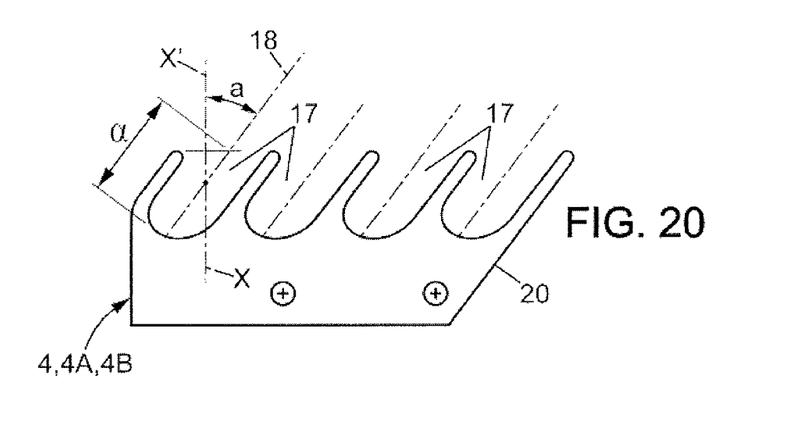
FIG. 20 represents a collector in the form of a comb comprising recesses arranged obliquely in order to collect products such as vials, the cross-section of which is not circular but oval, for example, and in order to form a batch of products arranged in a herringbone pattern.

FIG. 20 shows a collector 4, either 4A or 4B, in the form of a comb, capable of preparing a rectilinear row of products, which collector 4 is arranged to receive products 1 the cross-section of which is not circular, such as products like oval vials, for example.

These oval products 1 are grouped together by this collector 4 and they are arranged in a so-called "herringbone" configuration. This herringbone configuration makes it possible to group together several rows of products, two for example, in order to form a compact batch which also makes it possible to carry out, by means of an appropriate robot, immediate case packing of said batch of vials in a case of the "American box" type or of the "wrap around" type.

This collector 4, for products 1 of the oval vial type, comprises recesses 17 that are arranged obliquely relative to the longitudinal axis xx' of arrival of said products 1, which products 1 arrive aligned, one behind the other, oriented with their main axis arranged longitudinally, on said longitudinal axis xx'. Conversely, the axis 18 of the recesses 17 forms an angle a with the longitudinal axis xx'; this angle a, non-zero, is comprised between 10 and 45°, for example.

The oblique recesses 17 of the collector 4 carry out an automatic orientation of the products 1 in the form of vials due to the speed of introduction of said products into said recesses 17.

Figure 21:
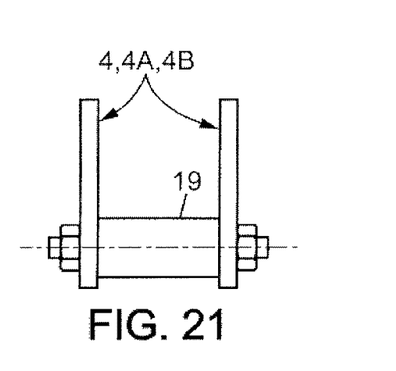
FIG. 21 shows a collector constituted by two superimposed recessed plates kept separate by spacers.

FIG. 21 shows, viewed from the side, a collector 4, either 4A or 4B, that is constituted by two collectors, of the straight or oblique recess type, which collectors are arranged one above the other, separated by one or more spacers 19. This convenient assembly of two collectors 4, with simple bolts, makes it possible to ensure better stability of the products 1 during their collection.

Figure 22:
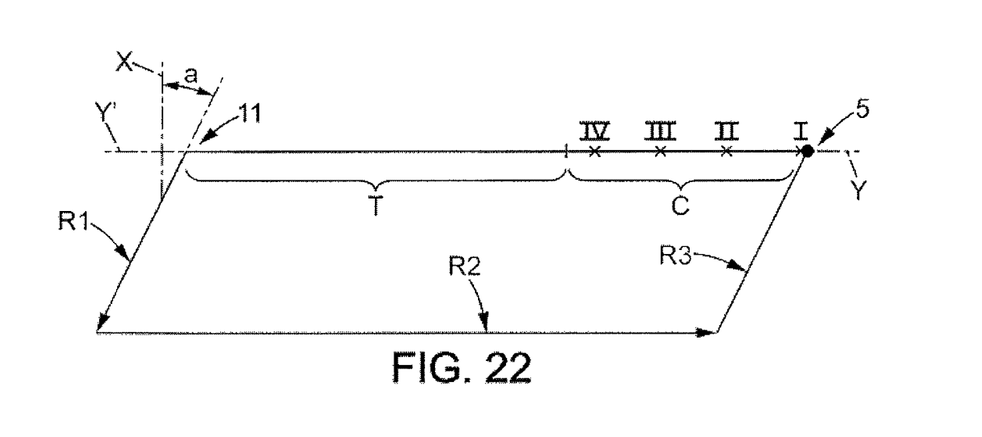
FIG. 22 shows a collecting cycle for a comb in which the recesses are arranged obliquely, as shown in FIG. 20.

FIG. 15 illustrates the looped path of the collectors 4 in a so-called "square" cycle for collectors 4 the recesses of which are centred on the longitudinal axis xx' of arrival of the products 1. FIG. 22 also illustrates this looped path diagrammatically, but for collectors 4 the recesses 17 of which are oblique, as shown in detail in FIG. 20.

These collectors 4, provided with oblique recesses 17, also operate in a polygonal cycle. The movement of each collector 4 commences by picking up, at the station 5, products 1 arriving on the infeed conveyor 2 and this collection is accompanied by a step-by-step movement that is marked C in this FIG. 22, with a mark from I to IV, in Roman numerals, for each collection of products 1.

The collection movement C and the following transfer movement, marked T, are carried out in a transverse movement, perpendicular to the longitudinal axis xx'. The transfer movement ends at the removal station 11 where the batch of products 1 is dropped off by the collector 4.

For the dropping off of the batch of products 1, the collector 4 moves backwards in a direction the orientation of which corresponds to that of the recesses 17 in order to avoid moving or upsetting the products 1 positioned in said recesses 17.

Thus, as shown in FIG. 22, the backward movement of the collector 4 extends over a rectilinear segment R1 that is parallel to the axis 18 of the recesses 17.

This longitudinal backward but oblique movement of the collector 4, after the dropping off of the batch at the removal station 5, requires an actuator 12, of the cylinder kind, as indicated previously, the movement of which is oriented along the axis 18 of the recesses 17 in order to carry out a rectilinear movement as indicated by the segment R1.

After the backward movement, the collector 4 moves along a transverse segment R2 before being placed back at the start, at the collection station 5 of the products 1.

The final, oblique, return movement of the empty collector 4 to the start, is carried out along a segment R3 that is also parallel to the axis 18 of the recesses 17.

The collector 4 comprises, at its downstream end, as shown in FIG. 20, a surface 20 arranged obliquely, like the recesses 17, in order to allow rapid positioning and placing end to end of the collectors 4, following one behind the other, at the collection station 5, in order to carry out, as previously described, continuous collection of the products arriving on the infeed conveyor 2.

The invention claimed is:

1. An equipment for grouping together products comprising:
    an infeed conveyor of the products, along a longitudinal axis
    a receiving table comprising a removal station for receiving collected batches of products, which receiving table is arranged at a same level as and on one side of said conveyor,
    collectors, in the form of combs, which are mobile above the level of said receiving table and said infeed conveyor, and
    a moving assembly for moving each collector relative to said infeed conveyor and relative to said receiving table, so as to carry out continuous collection of said products at a collection station,
    the equipment comprising:
        said collectors that are each held by a respective carriage by a respective actuator, which carriages are superimposed and guided transversely relative to said longitudinal axis, which actuators move said collectors so as to transfer said collectors from a transverse axis where said collectors carry out collection and removal of the products to a retracted position so that said collectors can return a start, by intersecting one another, and
        a control arrangement for controlling the position of the products on said infeed conveyor, which control arrangement comprises a sensor and an automatic controller for coordinating the movements of each collector at said collection station.

2. The equipment according to claim 1, wherein said carriages and said actuators are situated downstream of said infeed conveyor, at the same level as said collectors.

3. The equipment according to claim 1, wherein said carriages and said actuators are situated under a downstream end of said infeed conveyor, and said collectors are situated above said downstream end, said collectors being held by a structure that extends in front of said downstream end, connecting said collectors to the corresponding actuators.

4. The equipment according to claim 1, wherein said collectors are held by horizontal arms, which arms are bayonet-shaped and are offset vertically relative to each other in order to allow said collectors to intersect one another in turn.

5. The equipment according to claim 1, wherein said collectors are held by arms that are situated in a plane of said collectors, said arms and said collectors being vertically mobile by means of cylinders each interposed between a corresponding actuator and a corresponding carriage, in order to be vertically offset allowing said collectors to intersect one another in turn.

6. The equipment according to claim 1, wherein each collector comprises recesses the shape of which is adapted to the cross-section of the products to be collected.

7. The equipment according to claim 1, wherein each collector comprises recesses with a longitudinal depth of which makes it possible to receive several products that have been grouped together beforehand.

8. The equipment according to claim 1, comprising collectors each of which is provided with recesses that are arranged obliquely relative to a direction of arrival of the products, at an angle a of the order of 10° to 45°, said collectors being each held by a respective actuator also arranged obliquely, like said recesses.

9. The equipment according to claim 8, wherein said collectors have lateral ends arranged in order to allow two consecutive collectors to be placed end to end so as to carry out continuous collection of the products arriving on said infeed conveyor.

10. The equipment according to claim 1, further comprising at least one robot for picking up batches of products at said removal station, said robot being arranged with a head capable of picking up at least one batch of products.

11. The equipment according to claim 1, wherein said removal station is constituted by a stationary plane on which collected products take place as the collected products are moved laterally by a collector, which stationary plane comprises an arrangement of a boss or hump type in order to retain a batch of products when said collector moves backwards.

12. The equipment according to claim 1, further comprising a pushing device that carries out a lateral transfer of a batch of products received on said receiving table to a case packing system arranged around said receiving table and on which a blank of the "wrap around" type is travelling in order to group together products for packing in a case of the "wrap around" type.

13. A method for grouping together products arriving longitudinally one behind the other, spaced apart, at an equipment comprising:
- an infeed conveyor of the products, along a longitudinal axis
- a receiving table comprising a removal station for receiving collected batches of products, which receiving table is arranged at the same level as and on one side of said conveyor,
- collectors, in the form of combs, which are mobile above the level of said receiving table and said infeed conveyor, and
- a moving assembly for moving each collector relative to said infeed conveyor and relative to said receiving table, so as to carry out continuous collection of said products at a collection station, the equipment comprising:
- said collectors that are each held by a respective carriage by means of a respective actuator, which carriages are superimposed and guided transversely relative to said longitudinal axis, which actuators move said collectors so as to transfer said collectors from a transverse axis where said collectors carry out collection and removal of the products to a retracted position so that said collectors can return to a start, by intersecting one another, and
- a control arrangement for controlling the position of the products on said infeed conveyor, which control arrangement comprises a sensor and an automatic controller for coordinating the movements of each collector at said collection station, wherein the method comprises:
- continuously collecting on the fly the products on said infeed conveyor, by means of a pair of collectors, which move transversely along said transverse axis,
- collecting a first batch of products by means of a first collector then, when said first collector is filled up, collecting a second batch of products in the same way by means of a second collector that immediately takes over from said first collector,
- moving said first filled collector transversely, at a speed that is greater than a collection speed, and dropping off said first batch of products at said removal station,
- then moving said first collector in a loop that is divided into a backward movement for dropping off said first batch of products at said removal station, along a line that is parallel to the orientation of recesses of said collectors, then a return movement during which said first collector intersects said second collector which is being loaded, before being positioned behind said second collector and taking over the collection operation when said second collector is in turn filled up,
- moving said first batch formed by the products that have been dropped off by said first collector at said removal station,
- depositing said second batch of products collected by said second collector at said removal station,
- moving said second collector in the same loop as said first collector and continuing the cycle of collecting, grouping together and dropping off the products at said removal station,
- carrying out the collection of the products on said infeed conveyor;

wherein, for products the cross-section of which is not circular, of the oval type, and which are collected in a herringbone configuration in said collector recesses arranged obliquely, the method further comprises carrying out, during said backward movement of any collector from said removal station, a movement that is parallel to the orientation of said recesses before returning to said start, at said collection station of the products, the collection of the products on said infeed conveyor being carried out under the control of a sensor that detects the arrival of the products on said infeed conveyor, which sensor triggers, via an automatic controller, the stopping of said collector at said collection station.

* * * * *